United States Patent
Yu et al.

(10) Patent No.: US 6,894,993 B2
(45) Date of Patent: May 17, 2005

(54) DETECTION AND CORRECTION OF CHANNEL SWAP IN SPATIAL DIVISION MULTIPLE ACCESS SYSTEMS

(75) Inventors: Xiaoming Yu, Campbell, CA (US); Athanasios A. Kasapi, San Francisco, CA (US); Lars Johan Persson, Palo Alto, CA (US); Xiangzhong Zeng, Dublin, CA (US)

(73) Assignee: ArrayComm, Inc., San Jose, CA (US)

( * ) Notice: Subject to any disclaimer, the term of this patent is extended or adjusted under 35 U.S.C. 154(b) by 112 days.

(21) Appl. No.: 10/330,639

(22) Filed: Dec. 27, 2002

(65) Prior Publication Data

US 2004/0125767 A1 Jul. 1, 2004

(51) Int. Cl.[7] .................................................. H04Q 7/00
(52) U.S. Cl. ..................................... 370/329; 370/341
(58) Field of Search ................................ 370/329–331, 370/334–337, 339, 341, 345; 455/562

(56) References Cited

U.S. PATENT DOCUMENTS

| | | | | |
|---|---|---|---|---|
| 5,642,353 A | * | 6/1997 | Roy et al. ................ | 370/329 |
| 5,909,471 A | * | 6/1999 | Yun ........................... | 375/343 |
| 5,909,649 A | * | 6/1999 | Saunders .................. | 455/450 |
| 6,047,189 A | * | 4/2000 | Yun et al. ................. | 455/452.2 |
| 6,144,340 A | * | 11/2000 | Kiiski et al. .............. | 342/371 |
| 6,212,406 B1 | * | 4/2001 | Keskitalo et al. ........ | 455/562.1 |
| 6,240,098 B1 | * | 5/2001 | Thibault et al. .......... | 370/431 |

* cited by examiner

*Primary Examiner*—Chau Nguyen
*Assistant Examiner*—Soon D. Hyun
(74) *Attorney, Agent, or Firm*—Blakely Sokoloff Taylor & Zafman LLP (57) ABSTRACT

Embodiments of the invention provide various methods for detecting a spatial division multiple access (SDMA) channel swap. A first SDMA communication channel is assigned to a first user terminal that initially transmits its signal over the first SDMA communication channel. A second SDMA communication channel is assigned to a second user terminal that initially transmits its signal over the second SDMA communication channel. The first user terminal's signal and the second user terminal's signal are analyzed to determine that the first user terminal is transmitting its signal over the second SDMA communication channel and the second user terminal is transmitting its signal over the first SDMA communication channel.

56 Claims, 5 Drawing Sheets

DETECTION AND CORRECTION OF CHANNEL SWAP IN SPATIAL DIVISION MULTIPLE ACCESS SYSTEMS

FIELD

The present invention applies generally to signal processing in radio communication systems, and more particularly to the detection and correction of a channel swap in a spatial division multiple access system.

BACKGROUND

Radio communication systems may have a cellular architecture, with each cell corresponding roughly to a geographical area. Each cell includes a base station (BS), which is a local central cite through which a number of radio transmitter/receiver units (user terminals (UTs)) gain access to the communications system. The UTs could be, for example, telephones, PDAs, or small modem boards. A UT establishes a communication link with other UTs by requesting access to the system through the BS. Each UT communicates over a communication channel distinguished from other UTs.

Various techniques exist to increase the number of available channels for a given number of available frequencies. Time division multiple access (TDMA), for example, divides a single frequency into multiple time slots. Each of the time slots can then be allocated to a separate communication channel. Other known techniques include code division multiple access (CDMA) and frequency division multiple access (FDMA), which, like TDMA, are considered conventional multiple access schemes.

Radio communications systems may employ a spatial division multiple access (SDMA) scheme, in conjunction with one or more conventional multiple access schemes, to increase the number of UTs that a BS can serve for a given number of available frequencies. An SDMA scheme may be implemented using a BS that has an array of receiver and/or transmitter antenna elements. The antenna elements are spaced, one from another, and may be positioned in various configurations. The array of antenna elements introduces a spatial dimension that can be used to differentiate two or more UTs concurrently accessing a given conventional channel. That is, the basis of an SDMA system is that the BS creates a spatially distinct SDMA channel for each of multiple users even though they share the same carrier frequency (FDMA), timeslot (TDMA), or spreading code (CDMA).

A significant communication problem can occur in which the assigned spatial channel of two UTs become interchanged. This phenomenon, known as channel swap, may occur for several reasons.

Channel swap may occur where the spatial processing capability of the SDMA system is exceeded. Spatial processing relies on the difference in geographical location between two UTs. It is possible, therefore, for two UTs (especially when mobile) to become physically located too close to one another for accurate differentiation using spatial processing, leading to an increased probability of channel swap.

Channel swap may also be the result of an unstable communication signal of one or more of the UTs. For example, channel swap may also occur when one or more SDMA channels experiences deep fading and communication with the BS is interrupted. Upon resuming communication, the communication link between each UT may be swapped.

Channel swap is not detectable by either the UTs or the BS. This is because only the data streams are from different UTs. The swapped signals appear identical in terms of physical characteristics such as bit structure, coding, and cyclic redundancy check (CRC), among others.

Channel swap can have serious detrimental consequences. Channel swap may cause the users at each UT to become involved in unintended communications. For systems that implement a secure communication scheme (e.g., a data stream encryption scheme), each UT will be employing an erroneous encryption key. The result will be that each user may receive only annoying "white" noise during a channel swap for such systems.

SUMMARY

Embodiments of the invention provide various methods for detecting a spatial division multiple access (SDMA) channel swap. A first SDMA communication channel is assigned to a first user terminal that initially transmits its signal over the first SDMA communication channel. A second SDMA communication channel is assigned to a second user terminal that initially transmits its signal over the second SDMA communication channel. The first user terminal's signal and the second user terminal's signal are analyzed to determine that the first user terminal is transmitting its signal over the second SDMA communication channel and the second user terminal is transmitting its signal over the first SDMA communication channel.

Other features and advantages of embodiments of the present invention will be apparent from the accompanying drawings, and from the detailed description, that follows below.

DESCRIPTION OF THE DRAWINGS

The invention may be best understood by referring to the following description and accompanying drawings that are used to illustrate embodiments of the invention. In the drawings.

DETAILED DESCRIPTION

Overview

Embodiments of the invention provide methods for detecting an SDMA channel swap by periodically analyzing the signal from two or more UTs having spatially distinct channels. For one embodiment, the signals from each UT are encoded using an encoding scheme that has invalid (illegal)

outputs. For such an embodiment, if the data stream of the signal contains an invalid output, and the CRC does not indicate an error in the communication link, a channel swap is indicated. In an alternative embodiment, certain physical characteristics of the signals are analyzed to determine a channel swap. In still another embodiment, the results of error detection processes for different communication layers are compared to determine a channel swap.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of the invention.

Figure 1:
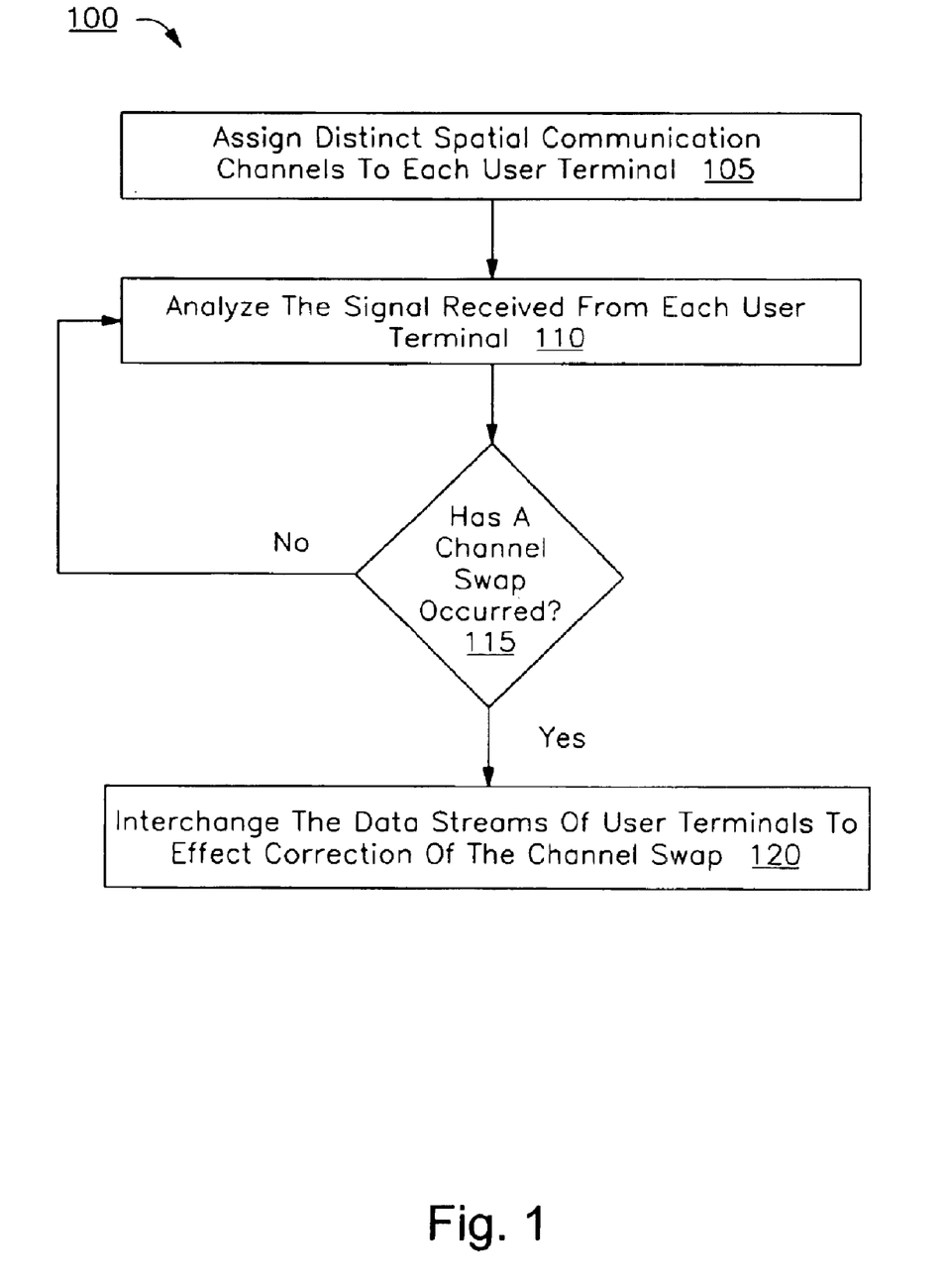
FIG. 1 illustrates a process in which an SDMA communication channel swap is detected and corrected in accordance with one embodiment of the invention.

FIG. 1 illustrates a process in which an SDMA communication channel swap is detected and corrected in accordance with one embodiment of the invention. Process 100, shown in FIG. 1, begins with operation 105 in which each of two UTs is assigned a spatially distinct communication channel. Depending on the air interface used (e.g., FDMA, TDMA, or CDMA), these communication channels may have the same carrier frequency, timeslot, or spreading code. Each UT uses its assigned SDMA communication channel to transmit its signal to communicate with the corresponding base station.

At operation 110 the signal received from one or both UTs is analyzed at the base station. Various forms of analysis (described below) may be used separately or in conjunction with one another.

Based upon the analysis of operation 110, a determination is made at operation 115 as to whether an SDMA channel swap has occurred. If a channel swap is not indicated, analysis of the UT signals recurs on a periodic basis.

If, at operation 115, channel swap is indicated then, at operation 120 the data streams for both UTs are interchanged at the base station for both uplink and down link, thus correcting the channel swap.

For alternative embodiments, in order to increase the reliability of the determination made at operation 115, the analysis of operation 110 is repeated one or more times prior to the corrective action of operation 120.

Figure 2:
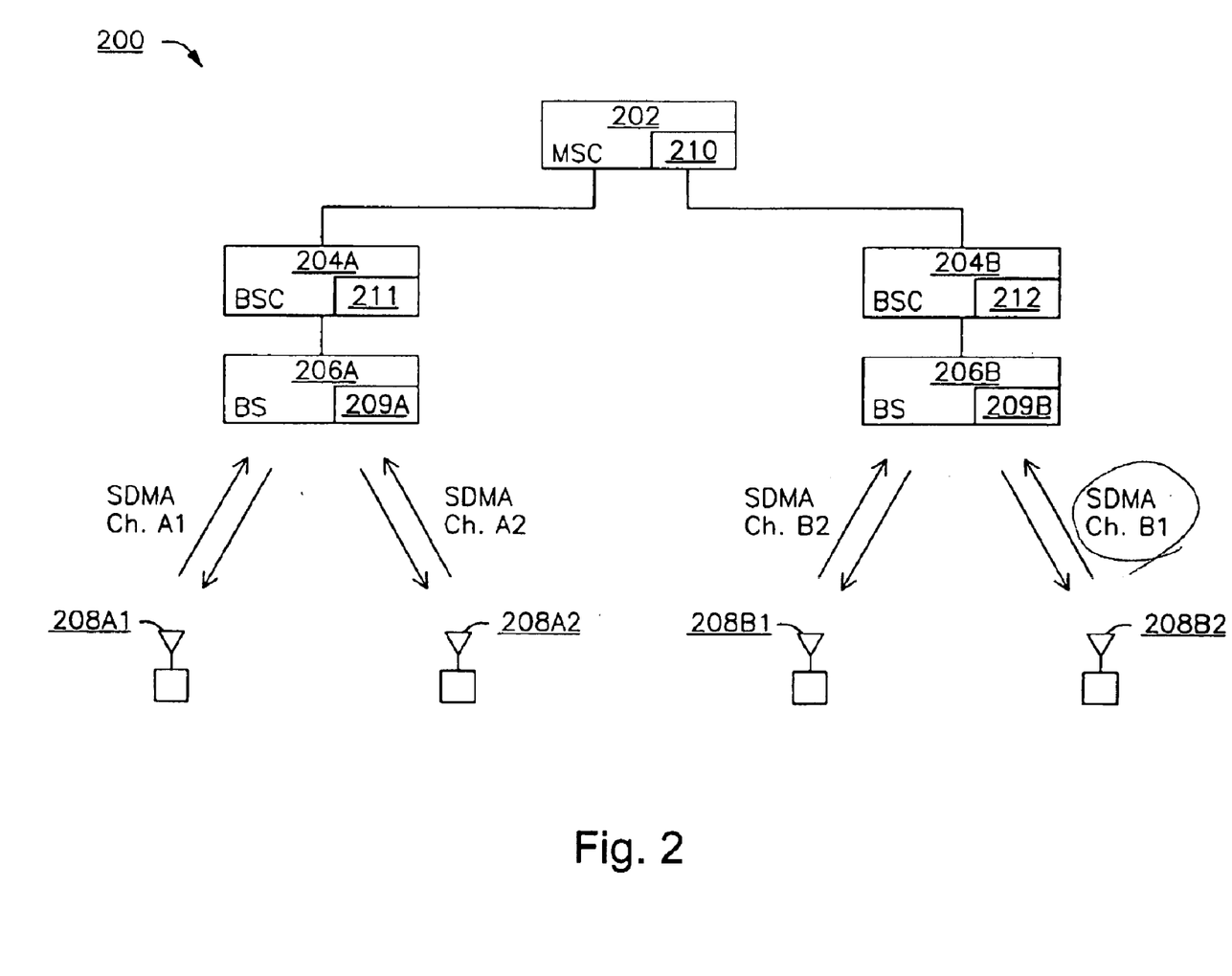
FIG. 2 illustrates an exemplary cellular radio communications network providing SDMA channel swap detection and correction functionality in accordance with an embodiment of the invention.

FIG. 2 illustrates an exemplary cellular radio communications network providing SDMA channel swap detection and correction functionality in accordance with an embodiment of the invention. Network 200, shown in FIG. 2, includes a plurality of BSs shown as BS 206A and 206B. The BSs couple to base station controllers (BSCs), shown as BSCs 204A and 204B, with each BSC serving a plurality of BSs. The BSCs also couple to a mobile switching center (MSC) 202 that may interface other MSCs and the Public Switched Telephone Network (PSTN). Together, the BSs, BSCs and the MSCs form a cellular radio network.

As shown in FIG. 2, UTs 208A1 and 208A2, being serviced by BS 206A are operating normally. That is, UT 208A1 is communicating data over its assigned SDMA channel, namely SDMA channel A1, and UT 208A2 is communicating data over its assigned SDMA channel, namely SDMA channel A2. However, UTs 208B1 and 208B2, being serviced by BS 206B have experienced an SDMA channel swap. That is, UT 208B1 is communicating data over the SDMA channel assigned to UT 208B2, namely SDMA channel B2, and UT 208B2 is communicating data over the SDMA channel assigned to UT 208B1, namely SDMA channel B1. The SDMA channel swap may be the result of an unstable communication signal of either UT or the proximity of UT 208B1 to UT 208B2, as shown in FIG. 2 and discussed above.

In accordance with an embodiment of the invention, each base station 206A and 206B, contains SDMA channel swap detection functionality, labeled 209A and 209B respectively, which may include software, hardware, or a combination thereof. Alternatively, or additionally, the MSC 202, and each BSC, 204A and 204B, may contain such functionality, shown as 210–212, respectively. The SDMA channel swap detection functionality effects the operations discussed above in reference to FIG. 1 and described, in alternative embodiments, in more detail below.

There are various methods of analyzing the UT signals to determine if an SDMA channel swap has occurred. These methods may take advantage of certain aspects of the particular air interface employed and may therefore be particularly suited to specific applications. The various methods may be used repeatedly to increase reliability of a determination that an SDMA channel swap has occurred. In general, the various methods may likewise be used in conjunction one with another to increase reliability.

Proscribed Data Stream Value Method

Some systems employ an encoding scheme that has proscribed output values for the data stream and also employ a scrambling code. For example, systems employing the Personal Handyphone System (PHS) typically use adaptive differential pulse code modulation (ADPCM) to encode an audio data stream. In a system using ADPCM, an output that contains a 0 bit is an illegal output. That is, the data stream from the encoder will not contain a 0 bit during normal operation. However, when an SDMA channel swap occurs, the wrong scramble sequence will be used for de-scrambling. The result is that 0 frequently appears in the swapped channel data stream. This can be used to detect an SDMA channel swap.

If the data stream contains a 0 bit, it typically indicates one of two circumstances; either the communication link is defective or an SDMA channel swap has occurred. To eliminate the possibility of a defective communication link, the CRC is examined.

Figure 3:
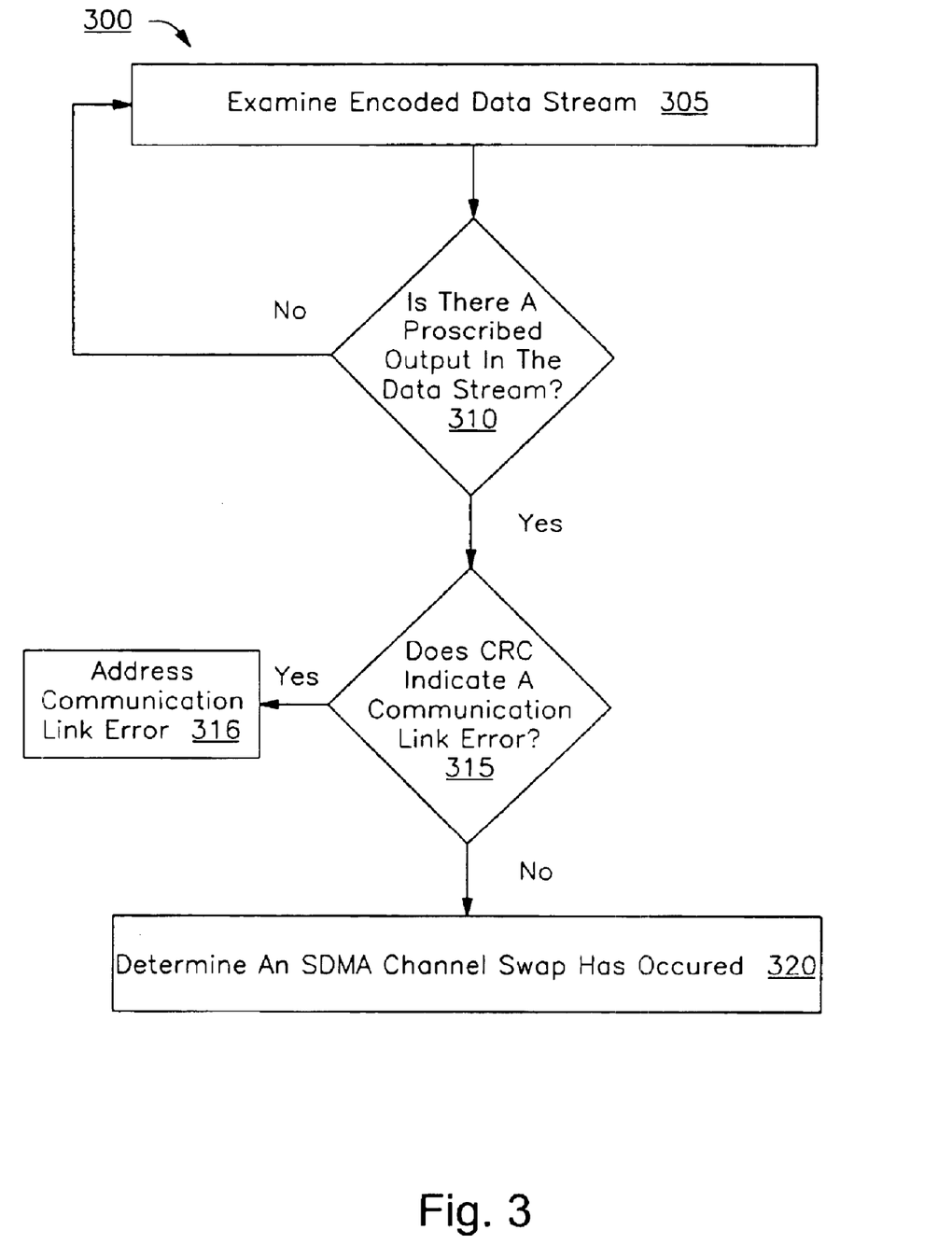
FIG. 3 illustrates a process in which a proscribed value in the data stream is used in conjunction with a CRC to detect the occurrence of an SDMA channel swap.

FIG. 3 illustrates a process in which a proscribed value in the data stream is used in conjunction with a CRC to detect the occurrence of an SDMA channel swap. Process 300, shown in FIG. 3, begins at operation 305 in which the encoded (e.g., ADPCM encoded) data stream is examined for proscribed outputs.

At operation 310, if the data stream does not contain a proscribed output, then there has been no SDMA channel swap and the data stream is examined again periodically (e.g., every data burst). If, at operation 310, the data stream does contain a proscribed output, then the process continues at operation 315 to determine the cause of the proscribed output.

At operation 315 the CRC is evaluated to determine if the CRC indicates a communication link error. If the CRC indicates a communication link error, then this is determined to be the cause of the proscribed output in the data stream. The communication link error is then addressed at operation 316. If the CRC indicates that no communication link error has occurred, then at operation 320 the cause of the proscribed output in the data stream is determined to be an SDMA channel swap. At this point the data streams of each UT may be interchanged at the BS to effect correction of the SDMA channel swap as discussed above. In an alternative embodiment, further data bursts may be evaluated prior to making a determination of SDMA channel swap, in order to increase the reliability of the determination.

Evaluation of the data stream to determine if proscribed outputs occur is a highly reliable and efficient method for determining that an SDMA channel swap has occurred. The method is applicable to systems employing an encoding scheme that has proscribed data stream outputs. Alternative embodiments of the invention provide methods for systems that do not necessarily employ such encoding schemes.

Signal Fingerprint Method

The physical characteristics of each of two SDMA signals can be used to distinguish them. For one embodiment, the BS that services the UTs is not only aware of each SDMA channel and link that has been established, but is also aware of the physical characteristics of the signal from each UT and maintains a history of one or more of these characteristics. The ability to distinguish the signals can be used to effect determination of an SDMA channel swap. For example there may be a sudden interchange of physical characteristics between two UTs in the event of an SDMA channel swap or the physical characteristics may indicate an SDMA channel swap in other ways. The physical characteristics that could be used for such a determination are numerous, but would not include those characteristics that would be the same for two SDMA channels (e.g., frequency or timeslot). Several exemplary physical characteristics are discussed below.

Frequency Offset

The local oscillator at each UT typically has a slight, but distinct frequency deviation from the established carrier frequency. For example, two UTs may be assigned a common carrier frequency of 1.895 MHz, where one UT is actually using 1.8953 MHz and the other is using 1.8957 MHz. This deviation from the assigned frequency may be due to frequency instability or hardware tolerances or imperfections.

Time of Arrival at the BS

Due to the difference in distance between two UTs and the BS that services them, the signal from each UT will have a different time of arrival as measured at the BS. That is, the BS has the capability of determining the time from transmission of a signal to reception at the BS. These times will typically vary for two UTs.

Spatial Signature

For typical SDMA systems employing a base station having an antenna array, the signal of each UT will exhibit a distinct spatial signature. The spatial signatures of each signal are dependent upon the particular location of the UT and the UT's particular signal propagation path.

Error Vector Magnitude

Each UT has different modulation accuracy due to manufacturer tolerances and imperfections in the UT components. Error vector magnitude (EVM) measurements are typically made to help reduce inter-symbol interference and increase signal-to-noise ratio (SNR).

Signal Spectrum

Where an SDMA channel swap has occurred, the signal from the UT may exhibit specific characteristics during spectral analysis. For example, in such cases the UTs signal may produce a noise-like spectrum.

Figure 4:
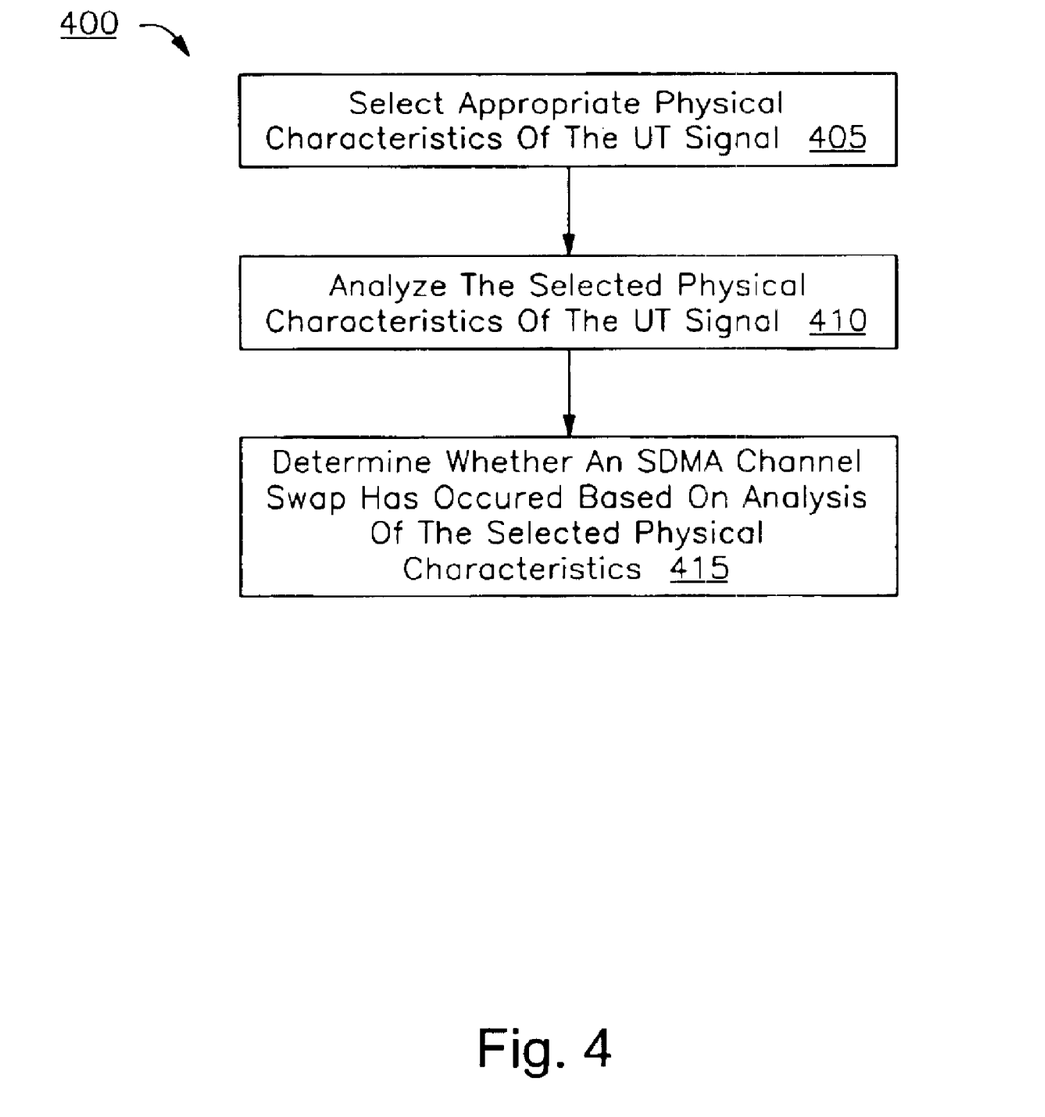
FIG. 4 illustrates a process in which one or more physical characteristics of the UTs' signal are used to detect the occurrence of an SDMA channel swap.

FIG. 4 illustrates a process in which one or more physical characteristics of the UTs' signal are used to detect the occurrence of an SDMA channel swap. Process 400, shown in FIG. 4, begins at operation 405 in which particular physical characteristics of the UT signal are selected for SDMA channel swap detection analysis. Certain physical characteristics may be better suited to a particular system. For example, for a wideband air interface system (e.g., CDMA), time-of-arrival may be more suitable than for a system employing an air interface having a narrower band (e.g., PHS). Also, certain physical characteristics may not be appropriate under certain circumstances. For example, where the UTs are proximately located, the spatial signature of each signal may be too similar to be adequately differentiated.

At operation 410, the one or more physical characteristics of the UT signal selected in operation 405 are analyzed. This analysis may include a comparison of the selected characteristic of the currently received signal with a history of the physical characteristic maintained at the BS for the particular channel. That is, for various embodiments the BS may maintain a history of one or more physical characteristics of the UT signal received on each SDMA channel. At the time of analysis, the currently received value of the UT signal is compared with these histories.

For alternative embodiments the analysis may be restricted to the currently received UT signal. For example as noted above, the signal spectrum of a UT signal received over a swapped SDMA channel exhibits indicative characteristics.

At operation 415 the analysis of operation 410 is used to make a determination of whether an SDMA channel swap has occurred. For example, if the physical characteristics of the currently received signal for a UT communicating over a particular SDMA channel more closely match the maintained history of the physical characteristics of the signal of a UT communicating over a different SDMA channel, then a determination that an SDMA channel swap has occurred is warranted. Again, such analysis may be repeated to increase the reliability of such determination. Additionally, any number of appropriate physical characteristics may be analyzed.

Inconsistent Error Detection Method

Data is typically communicated over several protocol layers of a hierarchy of layers. Each layer uses the layer immediately below it and provides a service to the layer above. For example, the typically lowest protocol layer is the physical layer that supports the electrical or mechanical interface to the physical medium. The physical layer determines the physical data stream structure for the layer above it (i.e., the data-link layer). The data-link layer is responsible for fragmenting data (e.g., dividing data into frames) for transmission on the physical layer.

Typically there is an error detection process (e.g., a CRC) implemented at the physical layer. Many systems implement an independent error detection process at one or more additional layers. For example, in a PHS system, when the PHS Internet Access Forum Standard (PIAFS) is used, there is an additional error detection process, across different physical layer frames, implemented at the data-link layer. Usually, the results of the error detection process at each layer are not communicated to the other layers. Such independent error detection processes implemented at different layers may be used to detect an SDMA channel swap.

Most circumstances that will lead to an error indication at the data-link layer will also lead to an error indication at the physical layer, but this is not the case for an SDMA channel swap. An SDMA channel swap will not cause a CRC to indicate an error at the physical layer because the physical data stream structure and CRC checksums will still be legal. However, an SDMA channel swap will produce an error at the data-link layer because the CRC at the data-link layer spans multiple physical frames. Therefore, if the error detection processes at the two layers are inconsistent, an SDMA channel swap may have occurred. In such an embodiment, the SDMA channel may be corrected in the physical layer, or in any layers above it (e.g., data-link layer, network layer, etc.)

Figure 5:
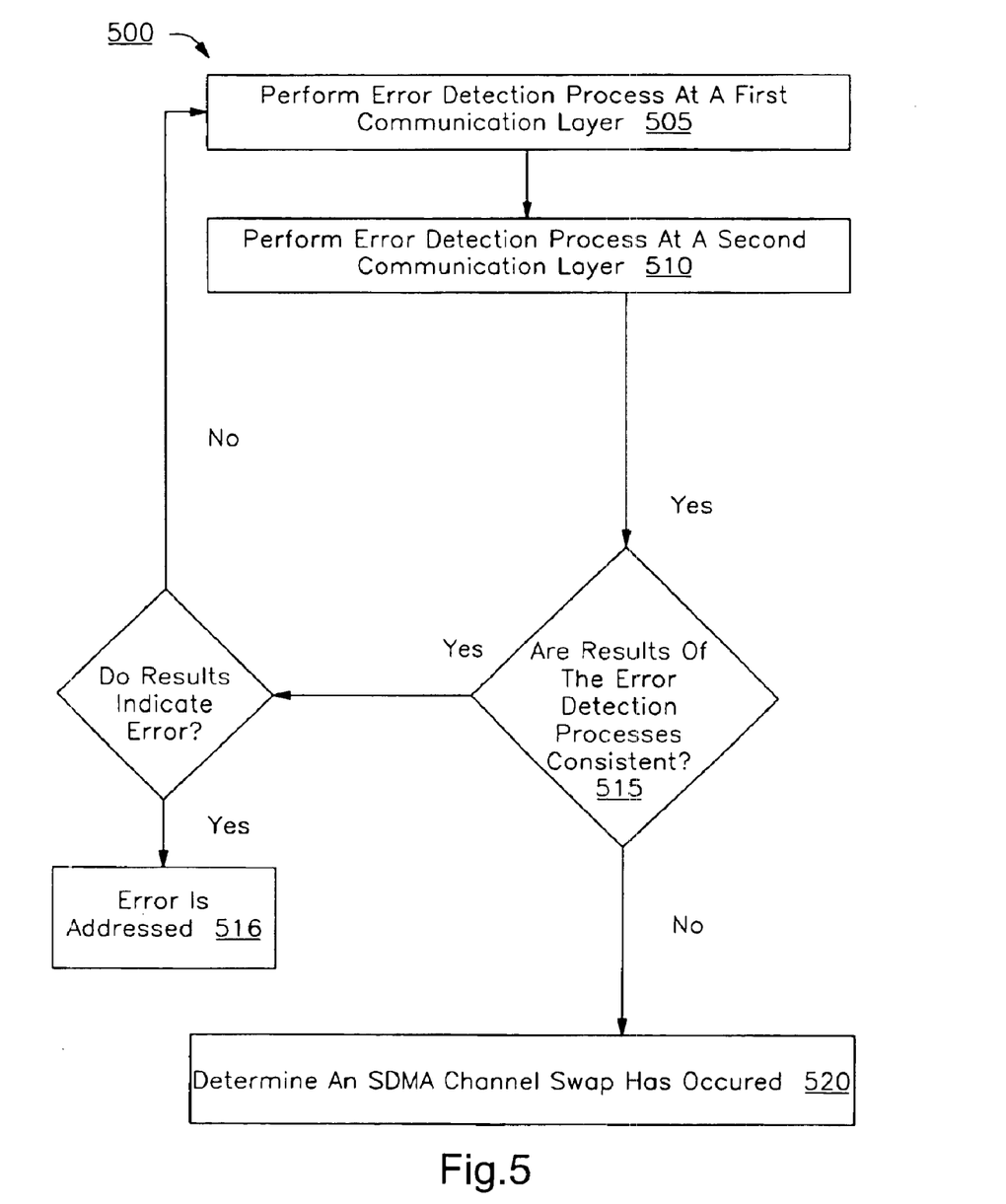
FIG. 5 illustrates a process in which independent error detection processes implemented at each of multiple communication layers are used to detect the occurrence of an SDMA channel swap.

FIG. 5 illustrates a process in which independent error detection processes implemented at each of multiple communication layers are used to detect the occurrence of an SDMA channel swap. Process 500, shown in FIG. 5, begins at operation 505 in which an error detection process is performed at the physical layer.

At operation 510 an independent error detection process is performed at the data-link layer.

At operation 515 the results of the error detection processes are compared. If the results of the error detection processes are consistent, and indicate an error, the error is addressed as appropriate at operation 516. If the results of the error detection processes are consistent, and indicate no error, the process is reinitiated at operation 505 and the results of subsequent error detection processes are compared.

If the results of the error detection processes are inconsistent, an SDMA channel swap is indicated at operation 520.

General Matters

A properly designed SDMA system should be able to detect an SDMA channel swap and effect correction "gracefully." Embodiments of the invention may be applied to detect and correct an SDMA channel swap. As noted, the foregoing methods may be used separately or in conjunction with one another, as appropriate, to increase reliability in determining if an SDMA channel swap has occurred.

The SDMA channel swap detection process may be repeated during the entire communication period, for example one or more methods may be performed at every data burst. In alternative embodiments, the SDMA channel swap detection process may be accomplished at a BS, a BSC, an MSC, or a combination of these control devices.

Upon detection of an SDMA channel swap, the BS or other control device effects correction by interchanging the data streams received over each SDMA channel, for both uplink and downlink. That is, the BS ascribes the UT data stream received over one SDMA channel to the other SDMA channel.

While several embodiments have been described in relation to their application to systems employing specific air interfaces (e.g., PHS, GSM, etc.), embodiments of the invention may be likewise applicable to a variety of other systems.

The invention includes various operations. The operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). The operations may be performed at a BS, a BSC, a MSC, or performed by a combination of these control devices.

Embodiments have been herein described in the context of a cellular radio communication system, but alternative embodiments may be applied to a wide variety of different systems in which data are exchanged. Such systems include voice, video, music, broadcast and other types of data systems without external connections. Many of the methods are described in their most basic form but operations can be added to or deleted from any of the methods without departing from the basic scope of the invention.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:

assigning a first spatial division multiple access (SDMA) communication channel to a first user terminal, the first user terminal initially transmitting a first signal over the first SDMA communication channel, the first signal having one or more characteristics associated therewith;

assigning a second SDMA communication channel to a second user terminal, the second user terminal initially transmitting a second signal over the second SDMA communication channel, the second signal having one or more characteristics associated therewith; and analyzing each of a signal transmitted from the first user terminal and a signal transmitted from the second user terminal to determine that the first user terminal is transmitting a signal having one or more characteristics associated with the first signal over the second SDMA communication channel and the second user terminal is transmitting a signal having one or more characteristics associated with the second signal over the first SDMA communication channel.

2. The method of claim 1 wherein the first user terminal is transmitting the first signal over the second SDMA communication channel and the second user terminal is transmitting the second signal over the first SDMA communication channel due to proximity of the first user terminal to the second user terminal.

3. The method of claim 1 wherein the first user terminal is transmitting the first signal over the second SDMA communication channel and the second user terminal is transmitting the second signal over the first SDMA communication channel due to instability of one or both of the first SDMA communication channel and the second SDMA communication channel.

4. The method of claim 1 further comprising:

interchanging a communication channel of the first signal with a communication channel of the second signal.

5. The method of claim 1 wherein the first signal and the second signal are encoded using an encoding scheme in which specified outputs are invalid and wherein analyzing the first signal and the second signal includes:

determining if a data stream of the first signal or a data stream of the second signal contains an invalid bit; and determining that a cyclic redundancy check of both the first SDMA communication channel and the second SDMA communication channel does not indicate a communication channel error.

6. The method of claim 5 wherein the encoding scheme is adaptive differential pulse code modulation.

7. The method of claim 6 wherein the invalid output contains a zero bit.

8. The method of claim 7 further comprising:

repeatedly analyzing the first signal and the second signal to increase reliability of the determination that the first user terminal is transmitting the first signal over the second SDMA communication channel and the second user terminal is transmitting the second signal over the first SDMA communication channel.

9. The method of claim 1 wherein analyzing the first signal and the second signal includes analyzing one or more physical characteristics of the first signal and the second signal.

10. The method of claim 9 wherein the one or more physical characteristics are selected from the group consisting of frequency offset, time of arrival at a base station, spatial signature, signal spectrum, direction-of-arrival of signals and modulation error vector magnitude.

11. The method of claim 10 further comprising:

repeatedly analyzing the first signal and the second signal to increase reliability of the determination that the first user terminal is transmitting the first signal over the second SDMA communication channel and the second user terminal is transmitting the second signal over the first SDMA communication channel.

12. The method of claim 4 wherein the first signal and the second signal are data communication signals and wherein analyzing the first signal and the second signal includes comparing a result of a first communication layer error detection process with a result of a second communication layer error detection process.

13. The method of claim 12 wherein determining that the first user terminal is transmitting the first signal over the second SDMA communication channel and the second user terminal is transmitting the second signal over the first SDMA communication channel includes determining that the result of the first communication layer error detection process is inconsistent with the result of the second communication layer error detection process.

14. The method of claim 13 wherein the first communication layer is a physical layer and the second communication layer is a data-link layer, the first communication layer error detection process indicating no error and the second communication layer error detection process indicating an error.

15. The method of claim 12 wherein the operation of interchanging a communication channel of the first signal with a communication channel of the second signal is accomplished at a communication layer selected from the group consisting of the physical layer, the data-link layer, and a subsequent communication layer of a communication layer hierarchy.

16. A cellular radio communications network comprising:

a mobile switching center;

at least one base station controller, coupled to the mobile switching center; and a plurality of base stations coupled to the at least one base station controller, each base station assigning assigning a first spatial division multiple access (SDMA) communication channel to a first user terminal, the first user terminal initially transmitting a first signal over the first SDMA communication channel, the first signal having one or more characteristics associated therewith;

assigning a second SDMA communication channel to a second user terminal, the second user terminal initially transmitting a second signal over the second SDMA communication channel, the second signal having one or more characteristics associated therewith; and analyzing each of a signal transmitted from the first user terminal and a signal transmitted from the second user terminal to determine that the first user terminal is transmitting a signal having one or more characteristics associated with the first signal over the second SDMA communication channel and the second user terminal is transmitting a signal having one or more characteristics associated with the second signal over the first SDMA communication channel.

17. The cellular radio communications network of claim 16 wherein a signal from each of the two user terminals is encoded using an encoding scheme in which specified outputs are invalid and wherein analyzing a signal of one or both of the two user terminals includes:

determining if a data stream of the signal of either of the two user terminals contains an invalid bit; and determining that a cyclic redundancy check of both SDMA communication channels does not indicate a communication channel error.

18. The cellular radio communications network of claim 17 wherein the encoding scheme is adaptive differential pulse code modulation.

19. The cellular radio communications network of claim 18 wherein the invalid output contains a zero bit.

20. The cellular radio communications network of claim 19 wherein the base station repeatedly analyzes the signal from each of the two user terminals to increase reliability of the determination that one or both of the two user terminals is transmitting a signal over the SDMA channel assigned to the other of the two user terminals.

21. The cellular radio communications network of claim 16 wherein analyzing a signal of one or both of the two user terminals includes analyzing one or more physical characteristics of the signal from each of the two user terminals.

22. The cellular radio communications network of claim 21 wherein the one or more physical characteristics are selected from the group consisting of frequency offset, time of arrival at a base station, spatial signature, signal spectrum, direction-of-arrival of signals, and modulation error vector magnitude.

23. The cellular radio communications network of claim 22 wherein the base station repeatedly analyzes the signal from each of the two user terminals to increase reliability of the determination that one or both of the two user terminals is transmitting a signal over the SDMA channel assigned to the other of the two user terminals.

24. The cellular radio communications network of claim 16 wherein the signal from each of the two user terminals is a data communication signal and wherein analyzing the signal from each of the two user terminals includes comparing a result of a first communication layer error detection process with a result of a second communication layer error detection process.

25. The cellular radio communications network of claim 24 wherein determining that one or both of the two user terminals is transmitting a signal over the SDMA channel assigned to the other of the two user terminals includes determining that the result of the first communication layer error detection process is inconsistent with the result of the second communication layer error detection process.

26. The cellular radio communications network of claim 25 wherein the first communication layer is a physical layer and the second communication layer is a data-link layer, the first communication layer error detection process indicating no error and the second communication layer error detection process indicating an error.

27. A machine-readable medium having one or more executable instructions stored thereon, which when executed by a digital processing system cause the digital processing system to perform a method, the method comprising:
    assigning a first spatial division multiple access (SDMA) communication channel to a first user terminal, the first user terminal initially transmitting a first signal over the first SDMA communication channel, the first signal having one or more characteristics associated therewith;
    assigning a second SDMA communication channel to a second user terminal, the second user terminal initially transmitting a second signal over the second SDMA communication channel, the second signal having one or more characteristics associated therewith; and
    analyzing each of a signal transmitted from the first user terminal and a signal transmitted from the second user terminal to determine that the first user terminal is transmitting a signal having one or more characteristics associated with the first signal over the second SDMA communication channel and the second user terminal is transmitting a signal having one or more characteristics associated with the second signal over the first SDMA communication channel.

28. The machine-readable medium of claim 27 wherein the first user terminal is transmitting the first signal over the second SDMA communication channel and the second user terminal is transmitting the second signal over the first SDMA communication channel due to proximity of the first user terminal to the second user terminal.

29. The machine-readable medium of claim 27 wherein the first user terminal is transmitting the first signal over the second SDMA communication channel and the second user terminal is transmitting the second signal over the first SDMA communication channel due to instability of one or both of the first SDMA communication channel and the second SDMA communication channel.

30. The machine-readable medium of claim 27 wherein the method further comprises:
    interchanging a communication channel of the first signal with a communication channel of the second signal.

31. The machine-readable medium of claim 27 wherein the first signal and the second signal are encoded using an encoding scheme in which specified outputs are invalid and wherein analyzing the first signal and the second signal includes:
    determining if a data stream of the first signal or the a data stream of the second signal contains an invalid bit; and
    determining that a cyclic redundancy check of both the first SDMA communication channel and the second SDMA communication channel does not indicate a communication channel error.

32. The machine-readable medium of claim 31 wherein the encoding scheme is adaptive differential pulse code modulation.

33. The machine-readable medium of claim 32 wherein the invalid output contains a zero bit.

34. The machine-readable medium of claim 33 wherein the method further comprises:
    repeatedly analyzing the first signal and the second signal to increase reliability of the determination that the first user terminal is transmitting the first signal over the second SDMA communication channel and the second user terminal is transmitting the second signal over the first SDMA communication channel.

35. The machine-readable medium of claim 27 wherein analyzing the first signal and the second signal includes analyzing one or more physical characteristics of the first signal and the second signal.

36. The machine-readable medium of claim 35 wherein the one or more physical characteristics are selected from the group consisting of frequency offset, time of arrival at a base station, spatial signature, signal spectrum, direction-of-arrival of signals and modulation error vector magnitude.

37. The machine-readable medium of claim 36 wherein the method further comprises:
    repeatedly analyzing the first signal and the second signal to increase reliability of the determination that the first user terminal is transmitting the first signal over the second SDMA communication channel and the second user terminal is transmitting the second signal over the first SDMA communication channel.

38. The machine-readable medium of claim 30 wherein the first signal and the second signal are data communication signals and wherein analyzing the first signal and the second signal includes comparing a result of a first communication layer error detection process with a result of a second communication layer error detection process.

39. The machine-readable medium of claim 38 wherein determining that the first user terminal is transmitting the first signal over the second SDMA communication channel and the second user terminal is transmitting the second signal over the first SDMA communication channel includes determining that the result of the first communication layer error detection process is inconsistent with the result of the second communication layer error detection process.

40. The machine-readable medium of claim 39 wherein the first communication layer is a physical layer and the second communication layer is a data-link layer, the first communication layer error detection process indicating no error and the second communication layer error detection process indicating an error.

41. The machine-readable medium of claim 40 wherein the operation of interchanging a communication channel of the first signal with a communication channel of the second signal is accomplished at a communication layer selected from the group consisting of the first communication layer, the second communication layer, and a subsequent communication layer of a communication layer hierarchy.

42. A method comprising:
    transmitting a first signal to a first user terminal over a first spatial division multiple access (SDMA) communication channel, the first signal having one or more characteristics associated therewith;
    transmitting a second signal to a second user terminal over a second spatial division multiple access (SDMA) communication channel, the second signal having one or more characteristics associated therewith; and
    analyzing each of a signal transmitted from the first user terminal and a signal transmitted from the second user terminal to determine that the first user terminal is receiving a signal having one or more characteristics associated with the first signal over the second SDMA communication channel and the second user terminal is receiving a signal having one or more characteristics associated with the second signal over the first SDMA communication channel.

43. The method of claim 42 wherein the first user terminal is receiving the first signal over the second SDMA communication channel and the second user terminal is receiving the second signal over the first SDMA communication channel due to proximity of the first user terminal to the second user terminal.

44. The method of claim 42 wherein the first user terminal is receiving the first signal over the second SDMA communication channel and the second user terminal is receiving the second signal over the first SDMA communication channel due to instability of one or both of the first SDMA communication channel and the second SDMA communication channel.

45. The method of claim 42 further comprising:
interchanging a communication channel of the first signal with a communication channel of the second signal.

46. The method of claim 42 wherein the first signal and the second signal are encoded using an encoding scheme in which specified outputs are invalid and wherein analyzing the first signal and the second signal includes:
determining if a data stream of the first signal or the a data stream of the second signal contains an invalid bit; and
determining that a cyclic redundancy check of both the first SDMA communication channel and the second SDMA communication channel does not indicate a communication channel error.

47. The method of claim 46 wherein the encoding scheme is adaptive differential pulse code modulation.

48. The method of claim 47 wherein the invalid output contains a zero bit.

49. The method of claim 48 further comprising:
repeatedly analyzing the first signal and the second signal to increase reliability of the determination that the first user terminal is receiving the first signal over the second SDMA communication channel and the second user terminal is receiving the second signal over the first SDMA communication channel.

50. The method of claim 42 wherein analyzing the first signal and the second signal includes analyzing one or more physical characteristics of the first signal and the second signal.

51. The method of claim 50 wherein the one or more physical characteristics are selected from the group consisting of frequency offset, time of arrival at a base station, spatial signature, signal spectrum, direction-of-arrival of signals and modulation error vector magnitude.

52. The method of claim 51 further comprising:
repeatedly analyzing the first signal and the second signal to increase reliability of the determination that the first user terminal is receiving the first signal over the second SDMA communication channel and the second user terminal is receiving the second signal over the first SDMA communication channel.

53. The method of claim 45 wherein the first signal and the second signal are data communication signals and wherein analyzing the first signal and the second signal includes comparing a result of a first communication layer error detection process with a result of a second communication layer error detection process.

54. The method of claim 53 wherein determining that the first user terminal is receiving the first signal over the second SDMA communication channel and the second user terminal is receiving the second signal over the first SDMA communication channel includes determining that the result of the first communication layer error detection process is inconsistent with the result of the second communication layer error detection process.

55. The method of claim 54 wherein the first communication layer is a physical layer and the second communication layer is a data-link layer, the first communication layer error detection process indicating no error and the second communication layer error detection process indicating an error.

56. The method of claim 53 wherein the operation of interchanging a communication channel of the first signal with a communication channel of the second signal is accomplished at a communication layer selected from the group consisting of the physical layer, the data-link layer, and a subsequent communication layer of a communication layer hierarchy.

* * * * *